US007421423B2

(12) United States Patent  (10) Patent No.: US 7,421,423 B2
Thompson  (45) Date of Patent: Sep. 2, 2008

(54) METHOD AND APPARATUS FOR IMPLEMENTING A CONDITIONAL PAYLOAD SERVER

(75) Inventor: R Donald Thompson, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 213 days.

(21) Appl. No.: 11/117,807

(22) Filed: Apr. 29, 2005

(65) Prior Publication Data

US 2005/0203945 A1 Sep. 15, 2005

Related U.S. Application Data

(63) Continuation of application No. 09/672,675, filed on Sep. 28, 2000, now Pat. No. 7,206,774.

(51) Int. Cl.
*G06F 17/30* (2006.01)
(52) U.S. Cl. .............................. 707/2; 707/6; 707/101; 707/102
(58) Field of Classification Search ................. None
See application file for complete search history.

(56) References Cited

U.S. PATENT DOCUMENTS

| 5,664,172 | A | 9/1997 | Antoshenkov |
| 5,806,061 | A | 9/1998 | Chaudhuri et al. |
| 6,334,125 | B1 | 12/2001 | Johnson et al. |
| 6,411,952 | B1 | 6/2002 | Bharat et al. |
| 6,424,967 | B1 | 7/2002 | Johnson et al. |
| 7,206,774 | B1 * | 4/2007 | Thompson .................. 707/3 |
| 2003/0037041 | A1 | 2/2003 | Hertz |

FOREIGN PATENT DOCUMENTS

EP 0 435 476 A2 7/1991

(Continued)

OTHER PUBLICATIONS

Auletta, V., et al., "Placing Resources in a Tree: Dynamic and Static Algorithms," *Proceedings of the 22nd Int'l Colloquium on Automata, Languages and Programming*, Szeged, Hungary, Jul. 10-14, 1995, pp. 232-243.

(Continued)

*Primary Examiner*—Tim Vo
*Assistant Examiner*—Hasanul Mobin
(74) *Attorney, Agent, or Firm*—Christensen O'Connor Johnson Kindness PLLC

(57) ABSTRACT

A system and method for implementing a conditional payload server are provided. A request for a payload corresponding to a subset of client attributes is obtained. Additionally, one or more payload(s) is obtained in which each payload defines criteria for delivering the payload. The criteria for delivering each payload are then embodied into an expression tree that is scored and optimized for traversal. The expression tree is converted into an evaluation tree data structure in which the conjunctive and disjunctive operators are the tree nodes and attribute evaluator value expressions are the leaf nodes. The expression tree is merged into a catalog data structure having a master attribute list, an evaluator list, a value list, a payload list, and a conjunction list. The catalog is then evaluated according to the subset of client attributes corresponding to the payload request and a payload is delivered.

6 Claims, 10 Drawing Sheets

FOREIGN PATENT DOCUMENTS

WO    WO 00/33228 A1    6/2000

OTHER PUBLICATIONS

Cheng, C., et al., "A Protocol to Maintain a Minimum Spanning Tree in a Dynamic Topology," *Proceedings of SIGCOMM '88 Symposium: Communications Architectures and Protocol*, Stanford, Calif., Aug. 16-19, 1988, pp. 330-338.

Courant, M., and S. Robin, "Classified Advertisement Analysis in the Context of an Expert System in Ad Matching," *Proceedings of the First Int'l Workshop on Natural Language Understanding and Logic Programming*, Rennes, France, Sep. 18-20, 1984, pp. 33-47.

Ester, M., et al., "The DC-Tree: A Fully Dynamic Index Structure for Data Warehouses," *Proceedings of the 16th International Conf. on Data Engineering*, IEEE Computer Society, San Diego, Calif., Feb. 28-Mar. 3, 2000, pp. 379-388.

Fisette, P., et al., "Minimal Dynamic Characterization of Tree-Like Multibody Systems" (abstract), *Nonlinear Dynamics* 9(1-2):165-184, Feb. 1996.

Goczyla, K., "Extendible Partial-Order Tree: A Dynamic Structure for Indexing on Multivalued Attributes," *Proceedings of the 20th Int'l Conf. on Information Technology Interfaces*, Pula, Croatia, Jun. 16-19, 1998, pp. 317-322.

Hu, D., et al., "Hierarchical Recognition Methods for Multi-Class Objects—Dynamic Binary Tree and Dynamic Multi-Branch Tree," *Proceedings of the Int'l Conf. on Signal Processing*, Beijing, China, Oct. 14-18, 1996, pp. 1284-1287.

Jianbo, H., "The Dynamic OverView Tree" (abstract), *Proceedings of the 5th Int'l Conf. for Young Computer Scientists*, Nanjing, China, Aug. 17-20, 1999, pp. 432-434.

Kutten, S., and A. Porat, "Maintenance of a Spanning Tree in Dynamic Networks," *Proceedings of the 13th Int'l Symposium on Distributed Computing*, Bratislava, Slovak Republic, Sep. 1999, pp. 342-355.

\* cited by examiner

METHOD AND APPARATUS FOR IMPLEMENTING A CONDITIONAL PAYLOAD SERVER

CROSS-REFERENCE TO RELATED APPLICATION

This application is a continuation of prior application Ser. No. 09/672,675, filed Sep. 28, 2000, priority from the filing date of which is hereby claimed under 35 U.S.C. § 120.

FIELD OF THE INVENTION

In general, the present invention relates to computer software and, more particularly, to a system and method for correlating a payload to a subset of attributes.

BACKGROUND OF THE INVENTION

Generally described, networks such as the Internet allow computer users to request and view content provided by a variety of other computers on the network, commonly known as content provider computer systems. Oftentimes a content provider receives a request for content from a client computer and returns the requested content, along with some embedded advertisement media, in the form of a Web page.

In one conventional approach to delivering the advertisement media, the content provider does not generate the advertisement media, but rather receives the advertisement media from a third party advertisement delivery system, which collects the advertisement media from a variety of media providers. Thus the advertisement delivery system serves as the intermediary between the content providers and the advertisement media providers. In a first aspect of this advertisement delivery system configuration, the advertisement media providers submit advertisements, which include the advertisement media, and one or more subsets of attributes serving as the criteria for determining whether the advertisement media should be delivered to a content provider. For example, some specific advertisements may indicate that the advertisement media should be delivered to males (determined from a user profile) who are viewing sports-related content provided by the content provider.

In another aspect of this advertisement delivery system configuration, the content providers send advertisement media requests to the advertisement delivery system. Generally, the request includes a specific subset of client attributes relating to the user profile and/or the content of the Web page. For example, an advertisement request may include client attribute data, such as the user's age, and/or content attribute data, such as that the user has requested information about bicycles. Accordingly, the advertisement delivery system attempts to return the advertisement media that corresponds to the specific subsets of client attributes submitted with the advertisement request.

As the number of advertisement media providers and content providers increases, many conventional advertisement delivery systems have the deficiency of being unable to match advertisements with the content provider attributes in an efficient manner. For example, one conventional advertisement delivery system utilizes a single linear queue to store all of the advertisement media that is to be matched and sent to the content provider. Accordingly, the size of the linear queue expands as a direct function of the number of advertisements supported by the advertisement delivery system. Moreover, in such an implementation, the content provider evaluates the inputted criteria (a subset of client attributes) against each entry in the queue in successive order until a match is found. Accordingly, as the number of entries (e.g., advertisements) in the queue increases, the efficiency of the linear advertisement delivery matching is further reduced.

Advertisement delivery systems generally have some sort of revenue generating provision or contractual obligation to deliver each advertisement media to a minimum number of users. Accordingly, depending on the criteria associated with each advertisement (subset of attributes for delivering the media), some combinations of client attributes are more unique than others. For example, one advertisement media provider may only require that the user be male to deliver the advertisement media, but requires that the advertisement to be delivered 100,000 times per day. Another advertisement media provider, however, may require the user to be male, the content to be related to cooking, and the geographic area of the user to be the Northwest—but only requires the advertisement to be delivered 100 times per day.

To establish priority between advertisements in the linear queue embodiment, the entire queue must be reordered. As will be readily understood, reordering of the entire queue is inefficient and may not reflect the appropriate priority between two specific advertisements. With reference to the above example, assume a content provider submits a request for a user who is male, lives in the Northwest, and requests content related to cooking. If the first advertisement was listed higher in the linear queue because of the number of times it must be delivered, the linear queue delivers the first advertisement without determining whether the second advertisement criterion was matched. However, because of the relative uniqueness of the three profile attributes, in some cases it would be more efficient to deliver the second advertisement.

Thus there is a need for a system and method for implementing a condition evaluator that can evaluate numerous payload requests with numerous payload delivery criteria in an efficient manner.

SUMMARY OF THE INVENTION

In accordance with this invention, a system and method for implementing a conditional payload server are provided. A request for a payload corresponding to a subset of client attributes is obtained. Additionally, one or more payloads are obtained in which each payload defines criteria for delivering the payload. The criteria for delivering each payload are then embodied into an expression tree, which is scored and optimized for traversal. The expression tree is converted into an evaluation tree data structure in which conjunctive and disjunctive operators are the tree nodes and attribute evaluator value expressions are the leaf nodes. The expression tree is merged into a catalog data structure having a master attribute list, an evaluator list, a value list, a payload list, and a conjunction list. The catalog is then evaluated according to the subset of client attributes corresponding to the payload request and a payload is delivered.

In accordance with other aspects of this invention, a computer-implementable method of correlating a subset of attributes to one or more payloads is provided. In accordance with the method, a request for a payload corresponding to a subset of client attributes is obtained. Additionally, one or more payloads defining a condition statement for delivering each payload is obtained. The condition statement is then correlated into a catalog that includes an attribute list, an evaluator list, a value list, and a payload list. The catalog is traversed to determine one or more payloads corresponding to the subset of client attributes obtained with the request for a payload. Accordingly, the one or more payload(s) is delivered.

In accordance with another aspect of the present invention, a computer-implementable method of correlating a payload with a subset of attributes for delivering a payload is provided. In accordance with the method, an expression tree corresponding to the subset of attributes is generated. The expression tree is mapped into an evaluation tree. Additionally, the expression tree is correlated into a catalog data structure having an attribute list, an evaluation list, a conjunction list, and a payload list.

In accordance with further aspects of the present invention, a computer-readable medium having computer-executable modules for correlating a payload with a condition statement for delivering the payload is provided. The computer-readable medium includes a master attribute module for storing a list of attributes and an evaluator module. The evaluator module is dynamically linked to the master attribute module and contains evaluators corresponding to each attribute in the attribute list. Additionally, the computer-readable medium includes a payload module and a conjunction module. The payload module is dynamically linked to the value module and contains payloads corresponding to each value in the value module. The conjunction module is dynamically linked to the value module and contains conjunction sets corresponding to each value in the value module. The payload module and the conjunction module may contain empty or null values.

In an application to an advertisement delivery system, the present invention facilitates the storage and processing of advertisement media payloads. Utilizing a catalog data structure, the present invention processes multiple advertisement media requests from content providers by correlating a prioritized master payload list to a specific subset of client attributes submitted by the content provider.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 14:
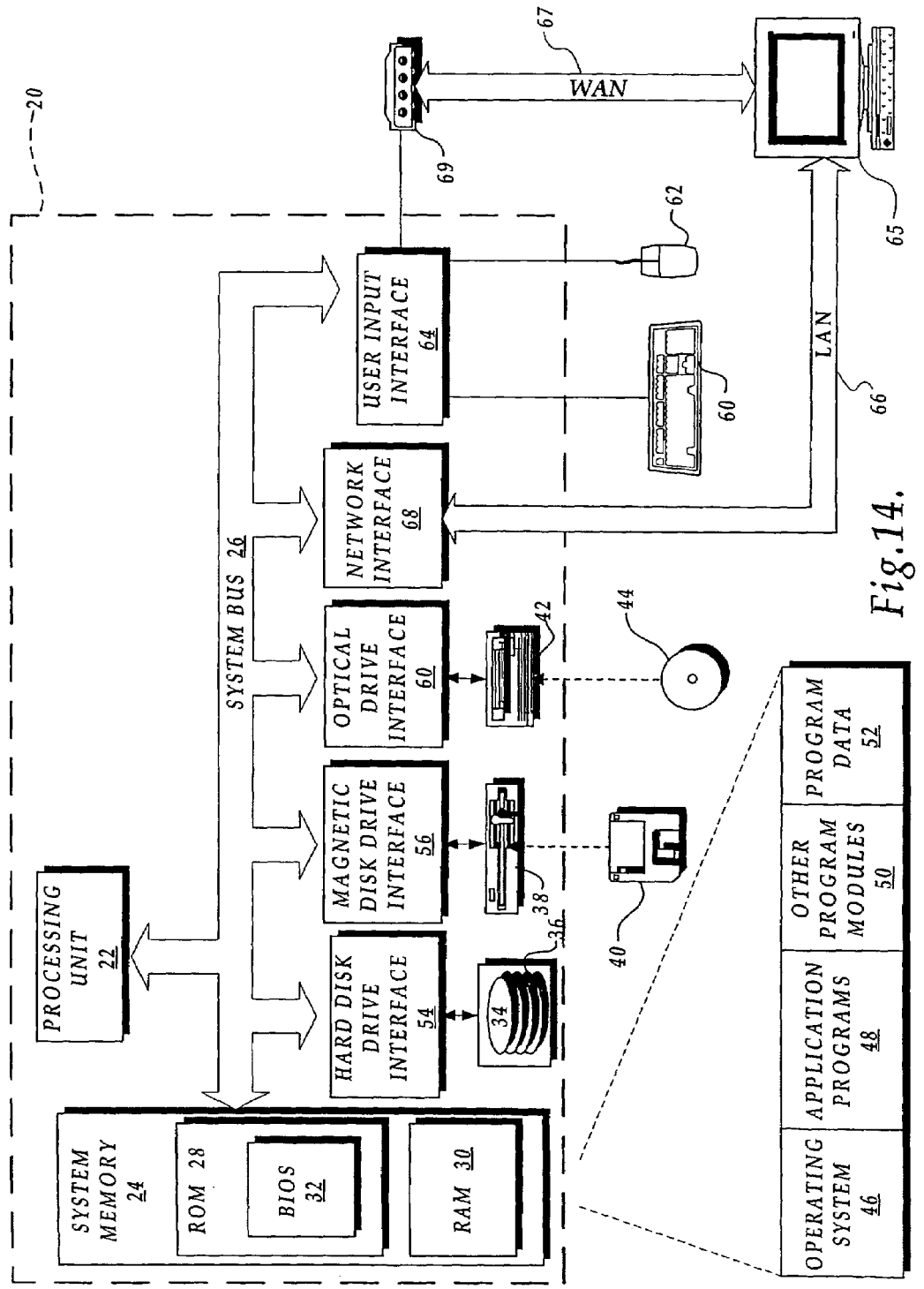
FIG. 14 is a block diagram of a computer system suitable for implementing the present invention.

FIG. 14 illustrates an example of a suitable computing system environment in which the invention may be implemented. The computing system environment is only one example of a suitable computing environment and is not intended to suggest any limitation as to the scope of use or functionality of the invention. Neither should the computing environment be interpreted as having any dependency requirement relating to any one or combination of components illustrated in the exemplary operating environment.

The invention is operational in numerous other general purpose or special computing system environments or configurations. Example of well known computing systems, environments, and/or configurations that may be suitable for implementing the invention include, but are not limited to personal computers, server computers, laptop devices, multiprocessor systems, microprocessor-based systems, network PCs, minicomputers, mainframe computers, distributed computing environments that include any of the above systems, and the like.

The invention may be described in the general context of computer-executable instructions, such as program modules, being executed by a computer. Generally, program modules include routines, programs, objects, components, data structures, etc., that perform a particular task or implement particular abstract data types. The invention may be also practiced in distributed computing environments where tasks are performed by remote processing devices that are linked through a communications network. In a distributed computing environment, program modules may be located in both local and remote computer storage media including memory storage devices.

With reference to FIG. 14, an exemplary system for implementing the invention includes a general purpose computing device in the form of a computer 20. Components of a computer 20 include, but are not limited to, a processing unit 22, a system memory 24, and a system bus 26 that couples various system components including the system memory to the processor. The system bus may be any of several types of bus structures including a memory bus or memory controller, peripheral bus, and a local bus using any of a variety of bus architectures. By way of example and not limitation, such architectures include Industry Standard Architecture (ISA) normal capitalization bus, Micro Channel Architecture (MCA) bus, Enhanced ISA (EISA) bus, Video Electronics Standards Association (VESA) local bus, and Peripheral Component Interconnect (PCI) bus also known as a Mezzanine bus.

The computer 20 typically includes a variety of computer-readable media. Computer-readable media can be any available media that can be accessed by the computer 20 and includes both volatile and nonvolatile media, removable and nonremovable media. By way of example and not limitation, computer-readable media may comprise computer storage media and communication media. Computer storage media includes, but is not limited to, RAM, ROM, EEPROM, flash memory or other memory technology, CD-ROM, Digital Versatile Disk (DVD) or other optical disk storage, magnetic cassettes, magnetic tape, magnetic disk storage or other magnetic storage devices, or any other medium that can be used to store the desired information and that can be accessed by the computer 20.

The communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner to encode information in the signal. By way of example and not limitation, communication media includes wired media such as a wired network or direct wired connection and wireless media such as acoustic, RF, infrared and other wireless media. Combinations of any of the above should also be included within the scope of computer-readable media.

Figure 12:
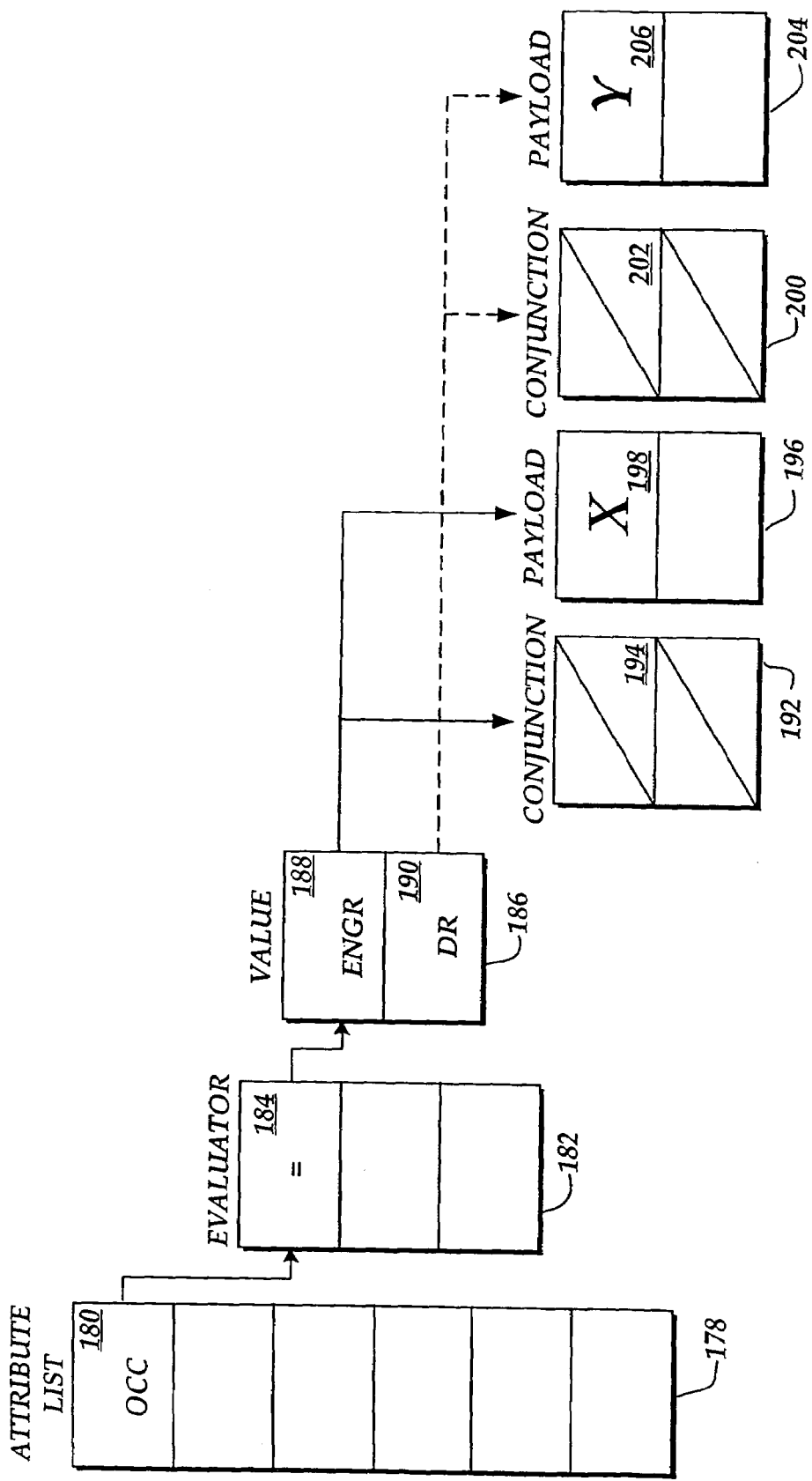
FIG. 12 is a block diagram of a secondary catalog data structure in accordance with the present invention.

The system memory 24 includes computer storage media in the form of volatile and/or nonvolatile memory such as read only memory (ROM) 28 and random access memory (RAM) 30. A basic input/output system 32 (BIOS) containing the basic routines that help to transfer information between elements within the computer 20, such as during start-up, is typically stored in ROM 28. RAM 30 typically contains data and/or program modules that are immediately accessible to and/or presently being operated on by the processing unit 22. By way of example and not limitation, FIG. 12 illustrates an operating system 46, application programs 48, other program modules 50, and program data 52.

The computer 20 may also include removable/nonremovable, volatile/nonvolatile computer storage media. By way of example only, FIG. 14 illustrates a hard disk drive 36 that reads from or writes to nonremovable, nonvolatile magnetic media 38, a magnetic drive 38 that reads from or writes to a removable, nonvolatile magnetic disk 40, and an optical disk drive 42 that reads from or writes to a removal, nonvolatile optical disk 44, such as CD-ROM or other optical media. Other removable/nonremovable, volatile/nonvolatile computer storage media that can be used in the exemplary operating environment include, but are not limited to, magnetic tape cassettes, flash memory cards, DVD, digital video tape, Bernoulli cap cartridges, solid state RAM, solid state ROM, and the like. The hard disk drive 34, magnetic disk drive 38, and optical disk drive 42 may be connected to the system bus 26 by a hard disk drive interface 54, a magnetic disk drive interface 56, and an optical drive interface 58, respectively. Alternatively, the hard disk drive 34, magnetic disk drive 38, and optical disk drive 42 are typically connected to the system bus 26 by a Small Computer System Interface (SCSI).

The drives and their associate computer storage media discussed above and illustrated in FIG. 14 provide storage of computer-readable instructions, data structures, program modules and other data for the computer 20. In FIG. 14, for example, the hard disk drive 34 is illustrated as storing the operating system 46, application programs 48, other programs 50, and program data 52. Note that these components can either be the same as or different from the operating system 46, the other program modules 50, and the program data 52. A user may enter commands and information into the computer 20 through input devices such as a keyboard 60 and a pointing device 62, commonly referred to as a mouse, track ball, or touch pad. Other input devices (not shown) may include a microphone, a joystick, a game pad, a satellite dish, a scanner, or the like. These and other input devices are often connected to the processing unit 22 through user input interface 64 and may be connected by other interface and bus structures, such as a parallel port, game port or other universal serial bus (USB).

The computer 20 may operate in a network environment using logical connections to one or more remote computers 65. The remote computer 65 may be a personal computer, a server, a router, a network PC, a peer device or other common network node, and typically includes many or all of the elements described above relative to the computer 20, although only a memory storage device has been illustrated in FIG. 14. The logical connections depicted in FIG. 14 include a local area network (LAN) 66 and a wide area network (WAN) 67, but also include other networks. Such network environments are commonplace in office, enterprise-wide computer networks, intranets, and the Internet.

When used in a LAN network environment, the computer 20 is connected to the LAN 66 through a network interface adapter 68. When used in a WAN network environment, the computer typically includes a modem or other means for establishing communications over the WAN 68, such as the Internet. The modem, which may be internal or external, may be connected to the system bus 26 via the serial port interface or other appropriate mechanism. In a networked environment, program modules depicted relative to the computer 20, or portions thereof, may be stored in the remote memory storage device. By way of example, and not limitation, FIG. 14 illustrates remote application programs 48 as residing on memory device 24. It will be appreciated that the network connections shown are exemplary and other means of establishing communication between the computers may be used. Although many other internal components of the computer 20 are not shown, those of ordinary skill will appreciate that such components and their interconnection are well known. Accordingly, additional details concerning the internal construction of the computer 20 need not be disclosed in connection with the present invention.

Those skilled in the art will understand that program modules such as the operating system 46, the application programs 48, and data 52 are provided to the computer 20 via one of its memory storage devices, which may include ROM 28, RAM 30, hard disk drive 34, magnetic disk drive 38, or optical disk device 42. The hard disk drive 34 is used to store data 52 and the programs, including the operating system 46 and application programs 48.

When the computer 20 is turned on or reset, the BIOS 32, which is stored in ROM, instructs the processing unit 22 to loan the operating system from the hard disk drive 34 into the RAM 30. Once the operating system 46 is loaded into RAM 30, the processing unit executes the operating system code and causes the visual elements associated with the user interface of the operating system to be displayed on the monitor 61. When an application program 48 is opened by a user, the program code and relevant data are read from the hard disk drive and stored in RAM 38.

As is appreciated by those skilled in the art, the World Wide Web (WWW) is a vast collection of interconnected or "hypertext" documents written in HyperText Markup Language (HTML) or other markup languages, that are electronically stored at WWW sites throughout the Internet. A WWW site is a server connected to the Internet that has mass storage facilities for storing hypertext documents and that runs administrative software for handling requests for those stored hypertext documents. A hypertext document normally includes a number of hyperlinks that may be identified in various ways (e.g., highlighted portions of text) that link the document to other hypertext documents possibly stored at a WWW site elsewhere on the Internet. Each hyperlink is associated with a Uniform Resource Locator (URL) and provides the exact location of the linked document on a server connected to the Internet and describes the document. Thus whenever a hypertext document is retrieved from any WWW server, the document is considered to be retrieved from the WWW. As is known to those skilled in the art, a WWW server may also includes facilities for storing and transmitting application programs, which are application programs written in the JAVA™ programming language from Sun Microsystems, for execution on a remote computer. Likewise WWW server may also include facilities for executing scripts or other application programs on the WWW server itself.

A consumer or other remote user may retrieve hypertext documents from the WWW via a WWW browser application program. The WWW browser is a software application program for providing a graphical user interface to the WWW. Upon request from the consumer via the WWW browser, the browser accesses and retrieves the desired hypertext document from the appropriate WWW server using the URL for the document and a protocol known as a HyperText Transfer Protocol (HTTP). HTTP is a higher-level protocol than TCP/IP and is designed specifically for the requirements of the WWW. It is used on top of TCP/IP to transfer hypertext documents between servers and clients. The WWW browser may also retrieve application programs from the WWW server, such as JAVA™ applets, for execution on the client computer.

The present invention relates to a system and method for implementing a conditional payload server. In accordance with an actual embodiment, the present invention will be described in relation to a system and method for delivering advertisement media payloads corresponding to a subset of client attributes such as user profile or Web site content information. As will be readily understood by one skilled in the relevant art, the present invention is not limited to its application to an advertisement media delivery system and the embodiment disclosed is only done by way of example.

Figure 1:
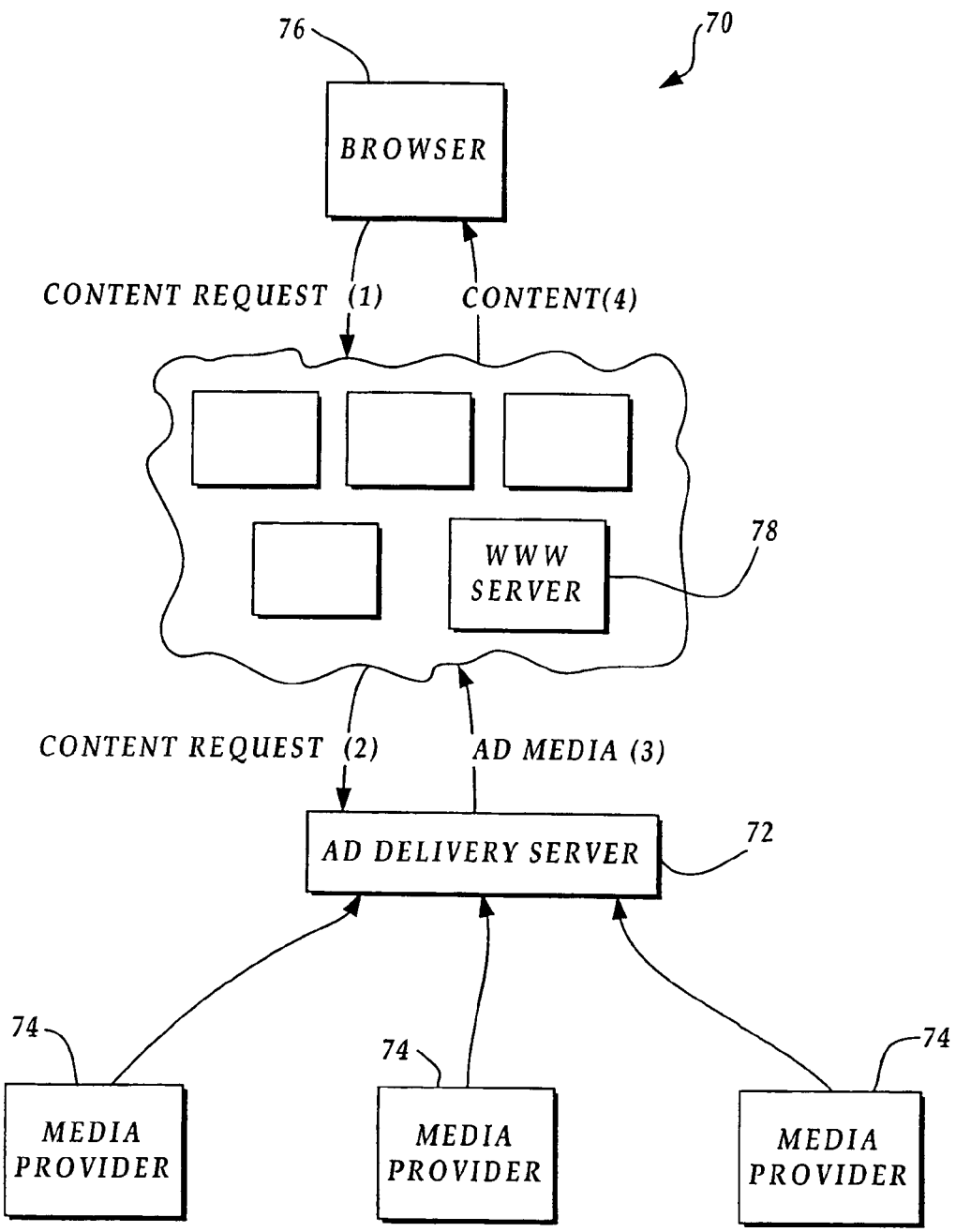
FIG. 1 is a block diagram of an illustrative advertisement delivery system in accordance with the present invention.

FIG. 1 is a block diagram illustrative of an advertisement media delivery network environment 70 in accordance with the present invention. The network 70 includes an advertisement delivery server 72 that receives advertisement media from numerous media providers 74. Each media provider 74 delivers advertisement media to the advertisement delivery server 72 and one or more subset(s) of attributes that make the delivery of advertisement media appropriate. As also illustrated in FIG. 1, a browser computer 76, in communication with a content provider 78 such as a WWW server, requests content from the content server 78. The content provider 78 obtains user profile information and content request information from the browser computer 76 and requests a corresponding advertisement from the advertisement delivery server 72. The advertisement delivery server 72 determines one or more advertisement media to be displayed with the content and returns the media—or URL to the media—to the content provider. In turn, the content provider 78 returns the content that includes the advertisement media to the browser computer 76. The present invention is directed to a method and system for correlating and selecting which advertisement media provided by the media providers 74 is delivered to the content provider 78.

Figure 2:
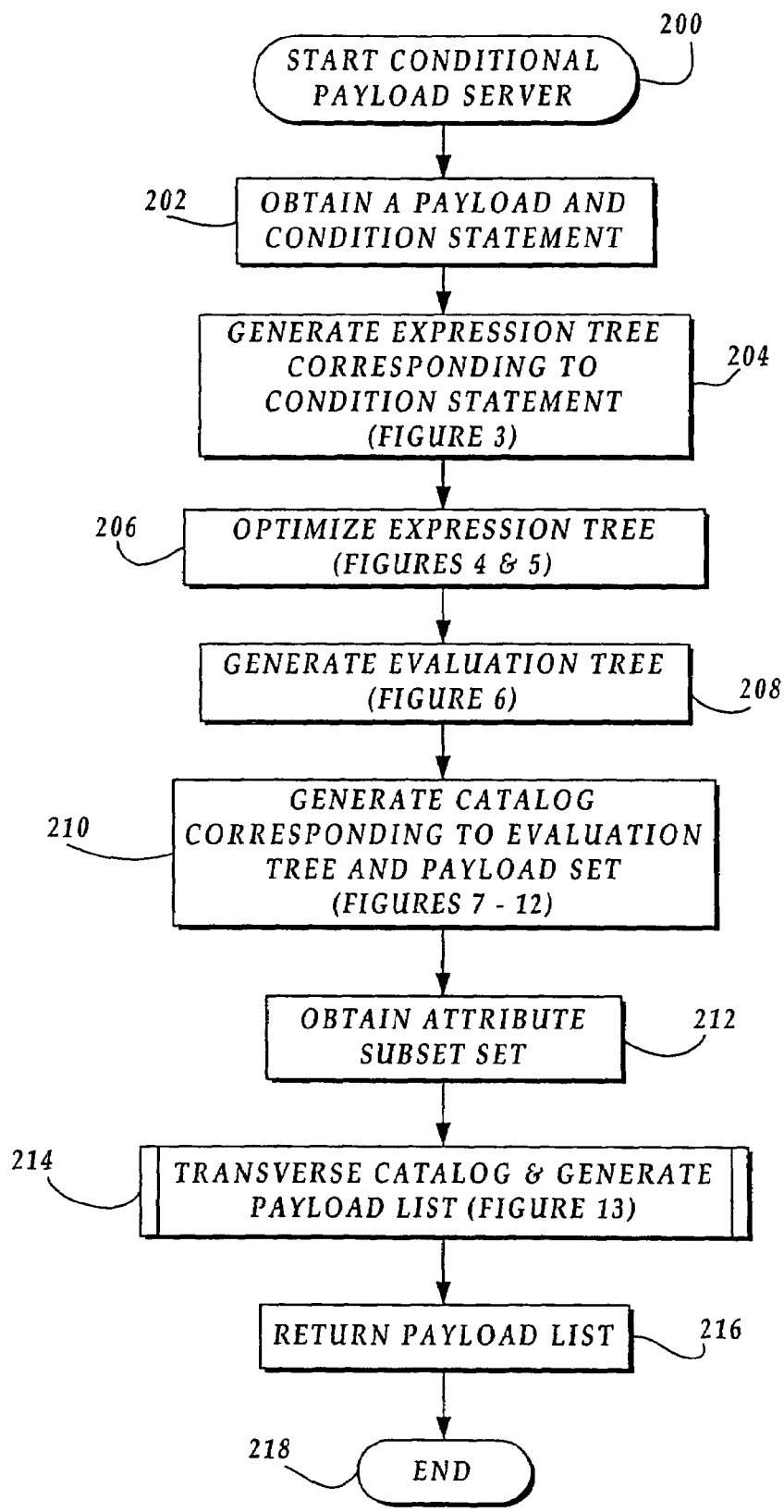
FIG. 2 is a flow diagram illustrative of a routine for correlating a subset of client attributes to a payload set in accordance with the present invention.

FIG. 2 is a flow diagram illustrative of a routine 200 for correlating a subset of client conditions to a payload, in accordance with the present invention. At block 202, a payload and condition expression are obtained. In an actual embodiment, the payload is advertisement media and the condition statement is subset of client attributes serving as the criteria for delivering the advertisement media payload.

The condition statement can be generally embodied as a logical Boolean-type sentence. For example, one subset of client attributes for delivering a payload requires the satisfaction of three user-profile attributes relating to the user's state of residence (STATE), the occupation of the user (OCC), and the gender (GENDER) of the user. Specifically, if the user lives in California (CA) or Washington (WA) and the user is an engineer (ENGR) or a doctor (DR) and the user is male (MALE), then the payload can be delivered. Alternatively, this statement can be embodied in the equation:

((STATE=WA OR STATE=CA) AND (OCC=ENGR OR OCC=DR)) AND (GENDER=MALE)

Figure 3:
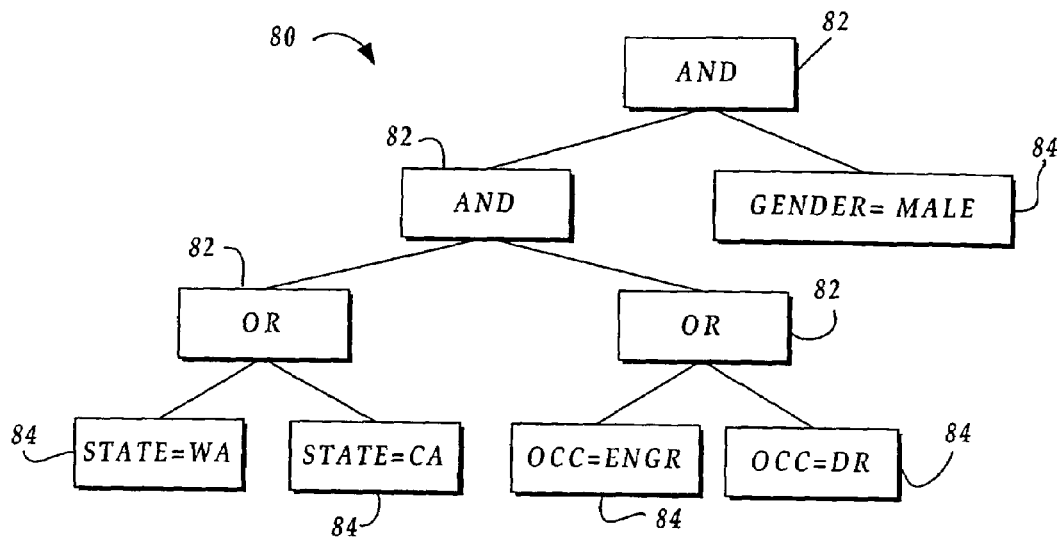
FIG. 3 is a block diagram of an expression tree.

After obtaining the payload and condition expression, at block 204, an expression tree corresponding to the condition statement is obtained. FIG. 3 is a block diagram illustrative of an expression tree 80. Specifically, the expression tree 80 relates to the illustrative logical statement described above. With reference to FIG. 3, the expression tree 80 includes tree nodes 82 that are the logical connectors of the condition statement, and leaf nodes 84 that are the attribute evaluator value pairs of the condition statement. As will be readily understood by one skilled in the relevant art, alternative data structures or expression tree configuration can be incorporated into the present invention.

Figure 4:
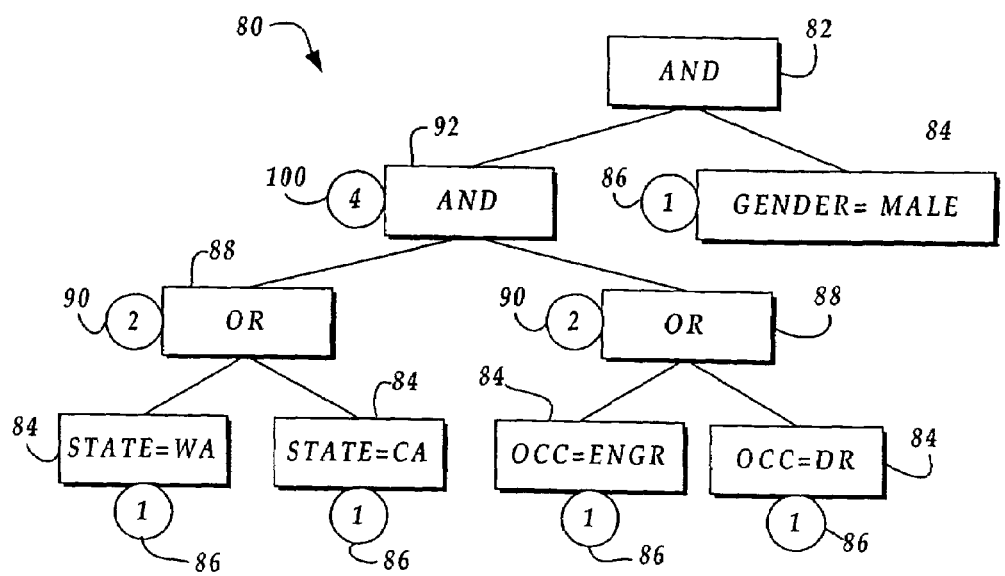
FIG. 4 is a block diagram of the expression tree of FIG. 3 illustrating a scoring of the expression tree in accordance with the present invention.
Figure 5:
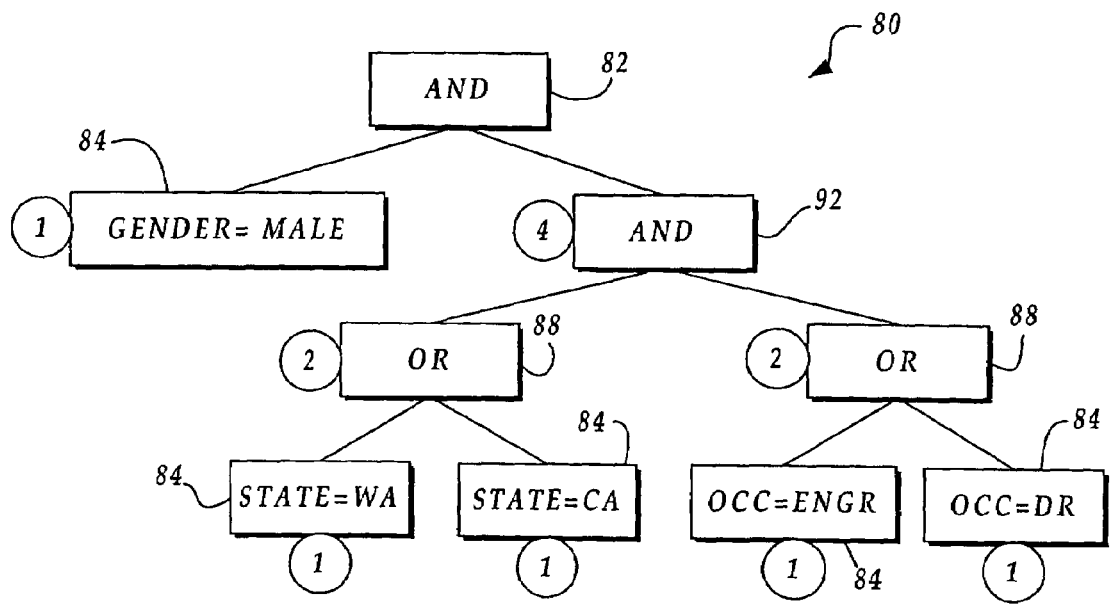
FIG. 5 is a block diagram of the expression tree of FIG. 3 illustrating the optimization of the expression tree in accordance with the present invention.

With continuing reference to FIG. 2, at block 206 the expression tree is optimized. FIGS. 4 and 5 are illustrative of a scoring and optimization method in accordance with the present invention. With reference to FIG. 4, each leaf node such as the attribute evaluator value pair 84 is given a score of "1" representative that the node is a termination node. Thereafter, each tree node 82 connected to the attribute evaluator value leaf node 84 is then given a score dependent on the subtree below it and whether the tree node 82 is conjunctive or disjunctive.

In an actual embodiment, each disjunctive tree node is given the score of the score equal to the sum of its subtree, which includes other tree nodes. Additionally, each conjunctive tree node is given a score of the product of its subtree that also includes other tree nodes. With reference to FIG. 4, at level 4 each attribute evaluator value leaf node 84 is given a score of "1" as illustrated at 86. At level 3, each disjunctive tree node 88 score is given the score "2" illustrated at 90 that is equal to the sum of the two leaf nodes 84. At level 2, the conjunctive tree node 92 is given the score of "4" illustrated at 100 that is equal to the product of the two disjunctive tree nodes 88, while the attribute evaluator value leaf node 84 is given a score of "1" illustrated at 86.

After scoring the evaluation tree, a test is done to determine whether the right-most node at each level of the expression tree contains the highest score. If so, the order of the nodes at the level of the expression tree is not adjusted. If not, the order of the nodes is reorganized such that the right-most node of the expression tree of that level contains the highest value. The process is repeated such that the scores of the nodes for each level are sequentially descending from right to left. With reference to FIG. 4, at level 2 the left-most node 92 contains the value of "4" while right-most node 84 contains the value of "1." Because the right-most node does not have the highest score and, as illustrated in FIG. 5, the nodes 92, 84 are reorganized. Levels 3 and 4, however, do not require reorganization. Accordingly, the expression tree 80 is now optimized.

Figure 6:
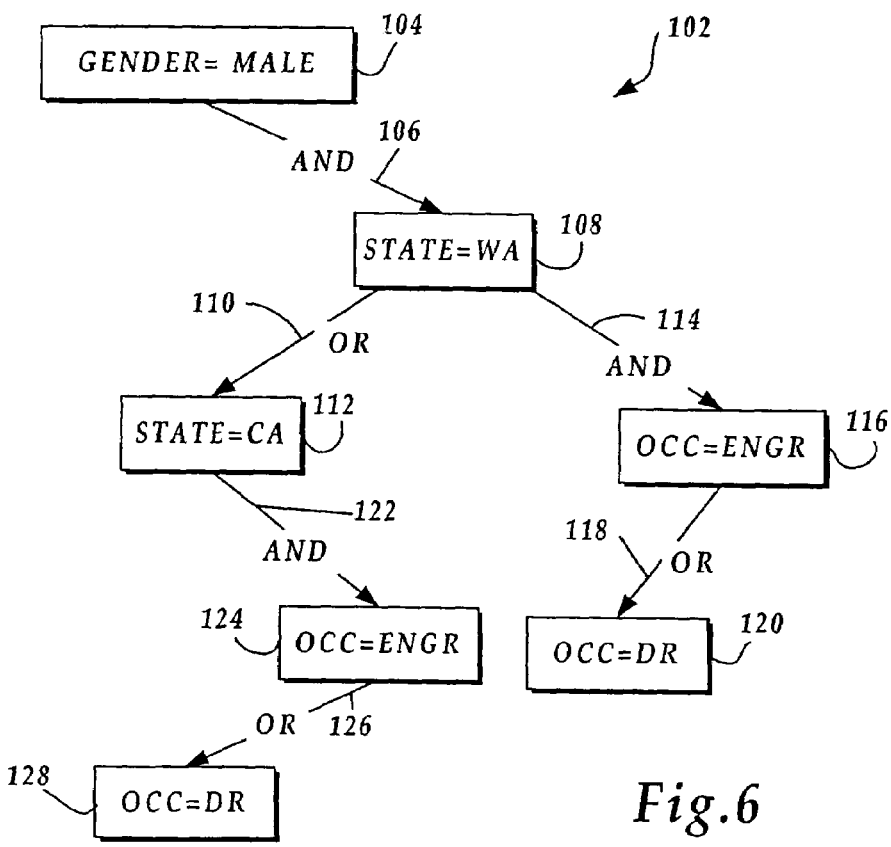
FIG. 6 is a block diagram illustrating an evaluation tree in accordance with the present invention.

Returning to FIG. 2, at block 208 an evaluation tree is generated. In an actual embodiment, an evaluation tree is a data structure derived from the expression tree 80 that facilitates the identification of the attribute evaluator value pair paths that make the delivery of a payload appropriate. FIG. 6 is a block diagram illustrative of an evaluation tree 102 derived from the expression tree 80, in accordance with the present invention. The evaluation tree 102 includes attribute evaluator value pairs 104 as both the leaf and tree nodes and with conjunctive logical operators 106 as right tree branches and disjunctive logical operators 108 as left tree branches. With reference to FIGS. 5 and 6, the top node 104 of the evaluation tree 102 corresponds to the left-most node of leaf node 84 of the optimized expression tree 80 at the highest level, which is level two Because a conjunctive tree node connects the left-most node 84 of the optimized expression tree 80, the evaluation tree creates a right tree branch 106 from the top-most node 104. The next node selected for the evaluation tree is at least another attribute evaluator value pair 84 that must also be satisfied. In the illustrative embodiment, the right tree branch 106 connects node 104 to the tree node 108, representing the attribute evaluator value pair "STATE=WA." However, because this attribute evaluator value pair is connected to another attribute evaluator pair via a disjunctive tree node 88 in the expression tree 80, node 112 representing the attribute evaluator value pair "STATE=CA" is connected to node 108 by a disjunctive tree branch 110. Accordingly, the disjunctive tree branch 110 indicates that either node 108 or node 112 may be satisfied in the condition statement.

With reference to either tree node 108 or node 112, if either attribute evaluator value pair is satisfied, conjunctive right tree branches 114 and 122 indicate that another attribute evaluator value pair must be examined. In the illustrative embodiment, the right tree branches 114, 122 are connected to tree nodes 116, 124, representing the attribute evaluator value pair "OCC=ENGR." Similarly, this attribute evaluator value pair is connected to another attribute evaluator pair via a disjunctive tree node 88 in the expression tree 80. Accordingly, nodes 120 and 128, representing the attribute evaluator value pair "OCC=DR", are connected to nodes 116 and 124 by disjunctive tree branches 118, 126, respectively.

Accordingly, the evaluation tree 102 is derived from the expression tree 80 and facilitates the identification of one or more node paths that will result in the delivery of a payload.

Figure 7:
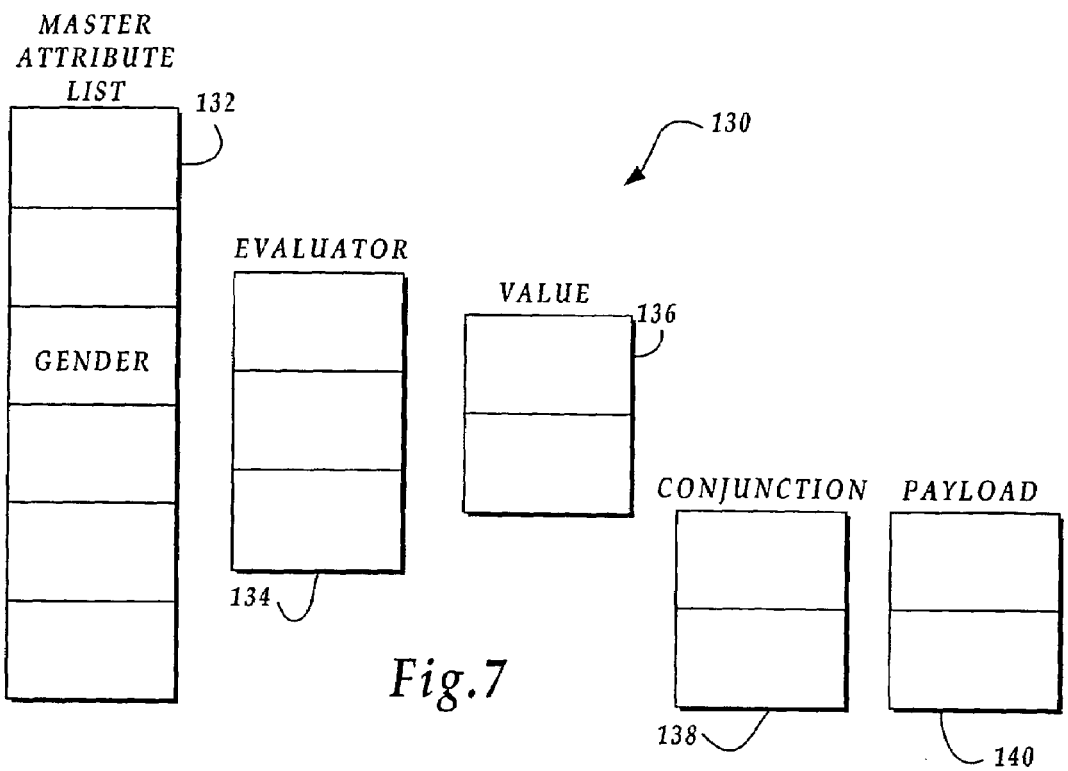
FIG. 7 is a block diagram illustrating a catalog data structure in accordance with the present invention.

Referring again to FIG. 2, at block 210 a catalog corresponding to the evaluation tree 102 and a payload is generated. FIG. 7 is a block diagram illustrative of a catalog data structure 130, in accordance with the present invention. The catalog 130 includes a master attribute list 132, an evaluator list 134, a value list 136, a conjunction list 138, and a payload list 140. The master attribute list 132 is generally a list, such as a queue, that includes an identification of one or more attributes to be compared. With reference to the evaluation tree 102, an attribute 142 in the master attribute list 132, representing the attribute "GENDER," corresponds to the first portion of the attribute evaluator value tree node 104 of the evaluation tree 102.

Figure 8:
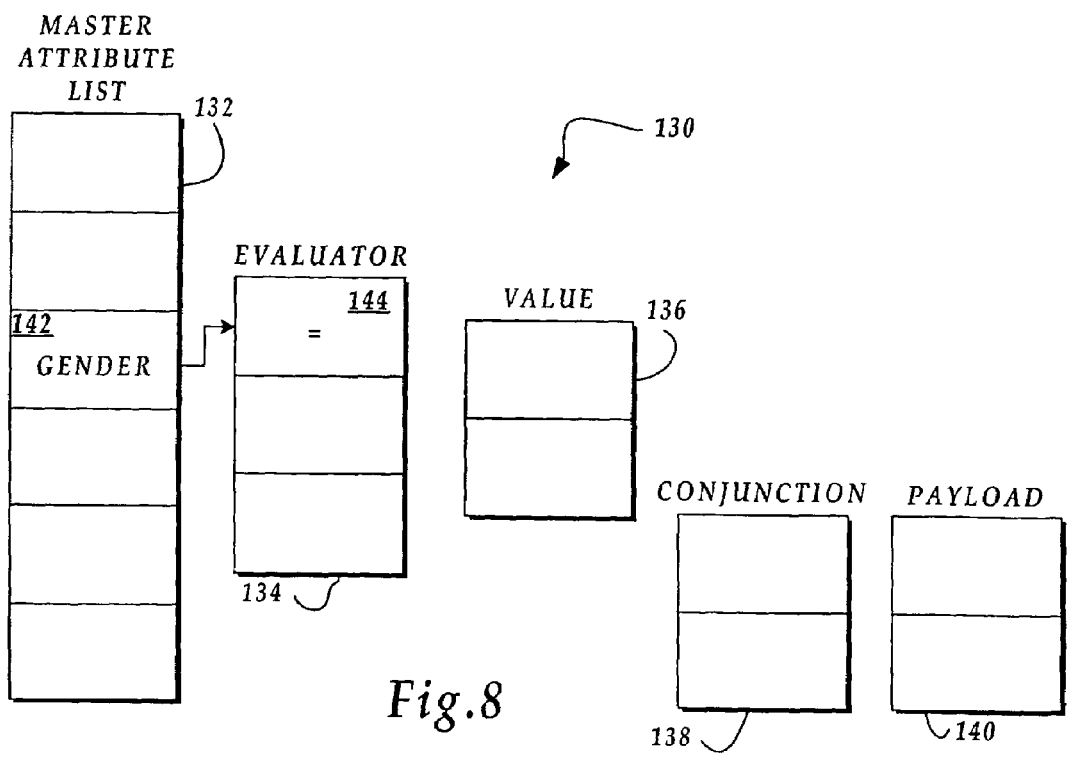
FIG. 8 is a block diagram of the catalog data structure of FIG. 7 illustrating the correlation between an attribute list and an evaluator list in accordance with the present invention.
Figure 9:
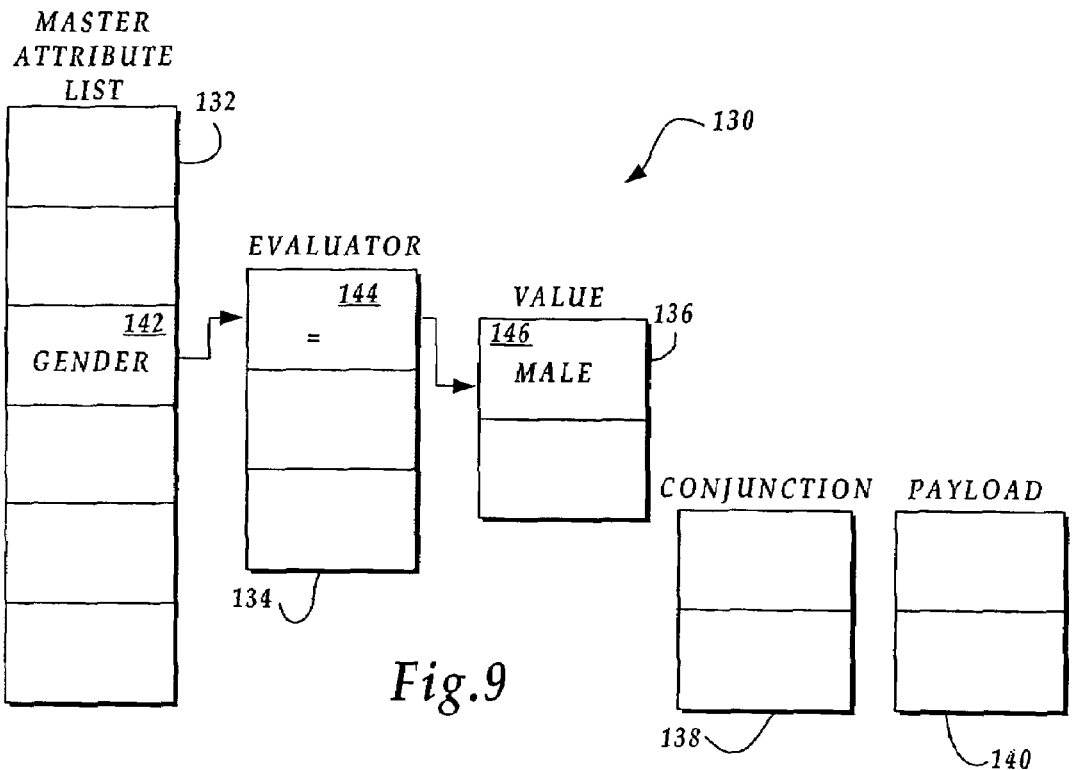
FIG. 9 is a block diagram of the catalog data structure of FIG. 7 illustrating the correlation between an evaluator list and a value list in accordance with the present invention.

Each attribute, such as attribute 142, corresponds to at least one evaluator located in an evaluator list 134. In this embodiment, attribute 142, "GENDER", corresponds to an evaluator, "=" illustrated at 144 in FIG. 8. Furthermore, each evaluator 142 corresponds to at least one value 146 in the value list 136. As illustrated in FIG. 9, evaluator 144 corresponds to value 146 "MALE." Accordingly, attribute evaluator value tree node 104 "GENDER=MALE" is merged into the catalog 130.

Figure 10:
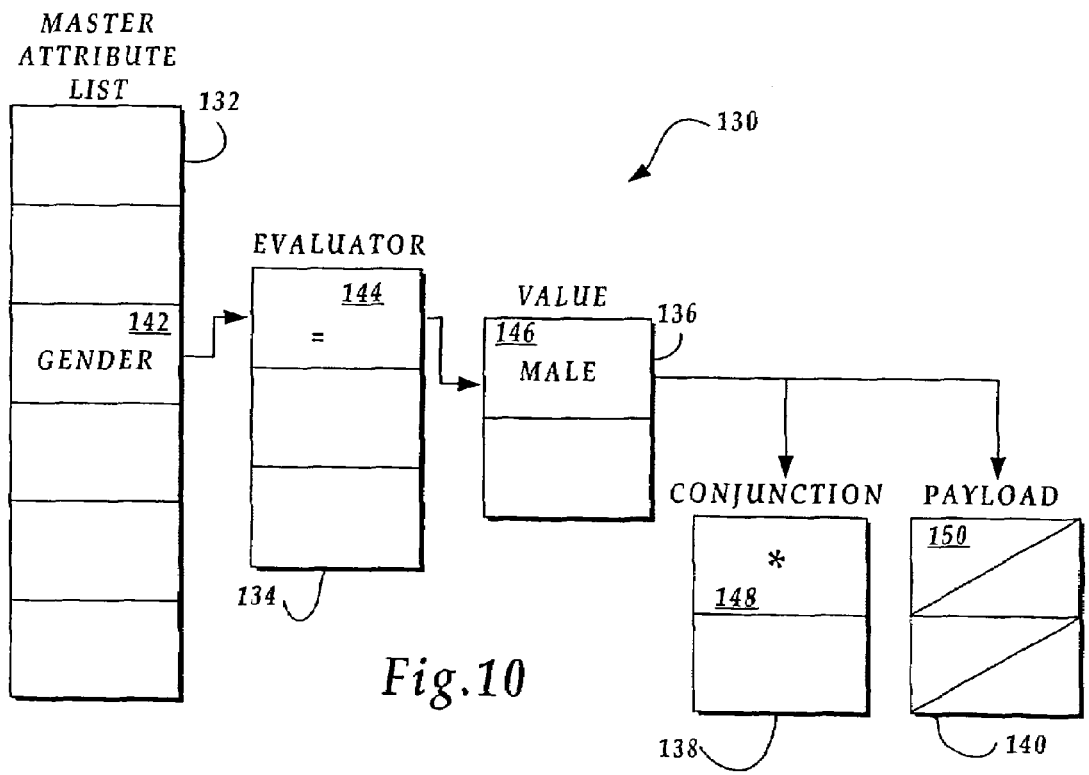
FIG. 10 is a block diagram of the catalog data structure of FIG. 7 illustrating the correlation between a value list and a conjunction list and payload list in accordance with the present invention.

Because the top-most node 104 corresponds to a right tree branch 106, the value node 146 also corresponds to at least one conjunction in a conjunction list 138. As illustrated in FIG. 10, the conjunction list 138 includes an identifier 148 of another attribute evaluator value pair to be evaluated. In the illustrative embodiment, the identifier 148 points to a second attribute 152 "STATE" that is another entry in the master attribute list 132. Additionally, because the condition statement directs that another attribute evaluator value pair must be evaluated before awarding a payload, the payload list 140 contains a null value 150 indicating that no payload should be added to a master payload list for satisfaction of this attribute evaluator value pair. As will be understood by one skilled in the relevant art, the payload list 140 may contain a payload to be awarded for satisfaction of the attribute evaluator value pair, even if the conjunction list 138 contains an identifier of another attribute evaluator value pair to be evaluated.

Figure 11:
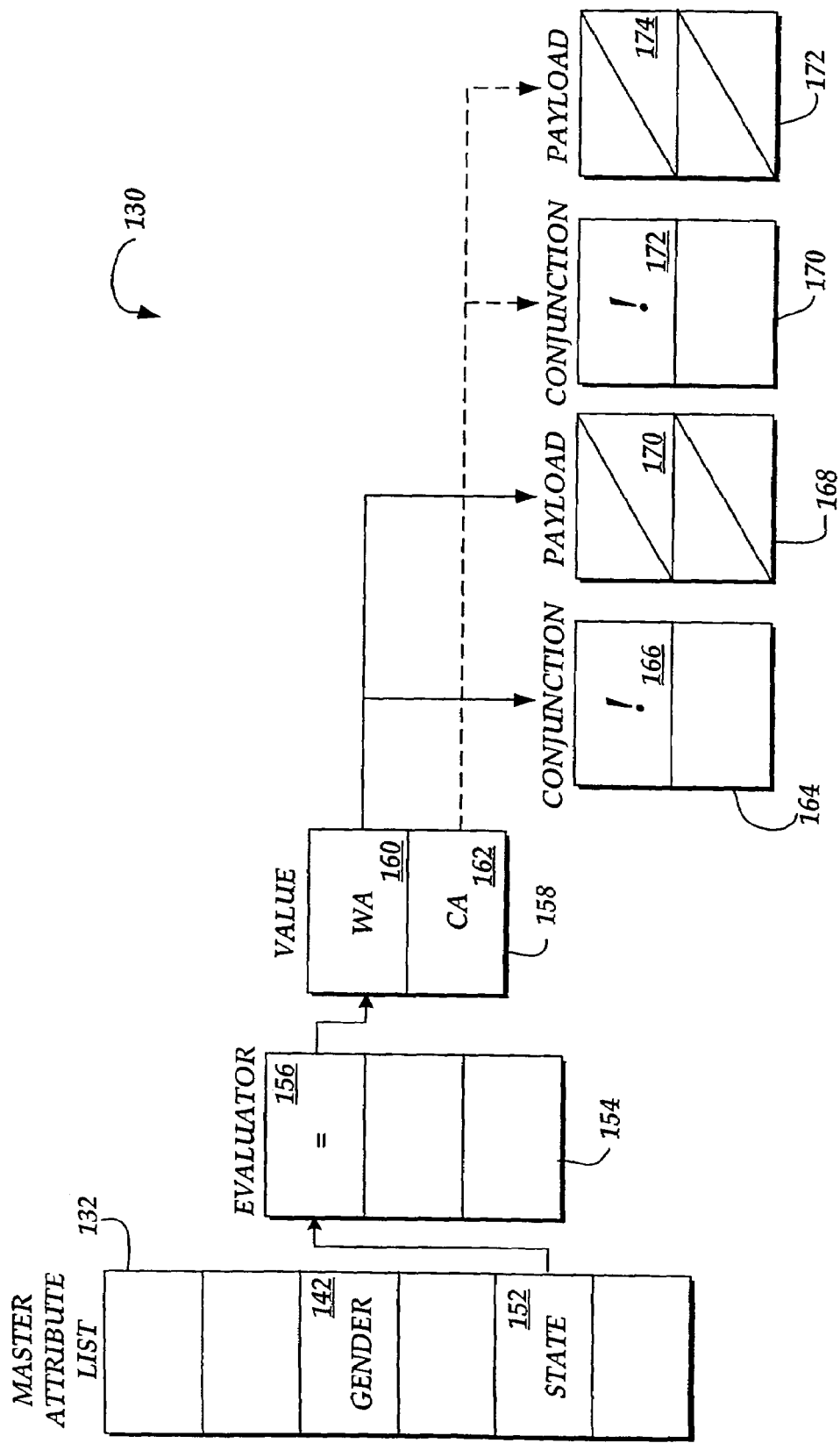
FIG. 11 is a block diagram of the catalog data structure of FIG. 7 illustrating a second attribute evaluator value pair in accordance with the present invention.

Referring now to FIG. 11, the second attribute 152 corresponds to a separate evaluator list 154 that includes the evaluator "=" illustrated at 156. As explained above, the evaluator 156 corresponds to a first value 160 "WA" in the value list 158. Additionally, because the node 108 is connected by a left tree branch 110 to node 112, value 162 "CA" also corresponds to evaluator 156. It should be understood, that nodes 108 and 112 have an identical evaluator, namely, "=." This allows the attribute 152 to point to a single evaluator 156 that, in turn, points to the two different values. In the event that two disjunctive nodes have different evaluators such as "=" and "<," the attribute would point to multiple evaluators in an evaluator list.

With reference to the value 160 "WA," a conjunction list 164 containing an identifier 166 indicates that another attribute evaluator value pair must be evaluated. Additionally, payload list 168 also indicates with null value 170 that no payload is to be added to the master payload list for satisfaction of this attribute evaluator value pair. Similarly, with reference to value 162 "CA," a separate conjunction list 170 contains an identifier 172 indicating that another attribute must be evaluated. Likewise, payload list 172 contains a null value 174 indicating that no payload is to be added to the master payload list for satisfaction of the attribute evaluator value pair.

FIG. 12 is illustrative of a secondary catalog data structure 176 utilized in accordance with the present invention. In an actual embodiment, the conjunction list such as conjunction list 164 or 170 may also refer to a secondary catalog data structure to complete the creation of the catalog. A secondary catalog data structure mitigates the amount of data that is stored and subsequently processed in the primary catalog data structure 130. Additionally, the secondary catalog data structure allows for specific attribute evaluator value pairs that may have limited applicability. For example, assume a condition statement includes the attribute evaluator value pair of "CITY=SEATTLE" as the last of four attribute evaluator value pairs that must be satisfied to award a payload. Accordingly, the payload list corresponding to this attribute evaluator value pair contains the payload. However, if the attribute "CITY" is place in the master attribute list 132 of the primary catalog data structure 130, a request having only the client attribute "CITY=SEATTLE" would incorrectly result in the awarding of the payload. Accordingly, by creating a secondary catalog data structure that is only accessible by a pointer from a conjunction list, the unique implementation of the attribute evaluator value pair can be evaluated only when the other attribute evaluator value pairs have been satisfied.

With reference to FIG. 12, the secondary catalog data structure 176 includes an attribute list 178 having attribute 180 corresponding to "OCC". Similar to the attributes 142, 152 in the master attribute list 132, each attribute in the attribute list 178 corresponds to one or more evaluators in an evaluator list 182. In turn, each evaluator corresponds to one or more value pairs in a value list 186. In this illustrative embodiment, attribute 180 "OCC" corresponds to evaluator 184 "=" that corresponds to value 188 "ENGR." Value 188 corresponds to a conjunction list 192 that contains a null value 194, indicating that no additional attribute evaluator value pairs must be evaluated. Additionally, value 188 corresponds to payload list 196 that indicates that payload "X" illustrated at 198 should be added to the master payload list if the attribute evaluator value pair is satisfied.

In the illustrative embodiment, the payload list 196 contains a single payload 198. However, the payload list 196 may contain two or more payloads that are given a priority. For example, each payload may be defined with a variable priority number range. Accordingly, the payload with the highest priority would be defined by a higher number in the range. In the event that two or more payloads are found in the same payload list, in an actual embodiment they are ordered in the payload list according to their priority for that particular attribute evaluator value pair. Additionally, payloads may be added to the master payload list after satisfaction of an attribute evaluator value pair, even if additional attribute evaluator value pairs must be examined. In such an event, the master payload list is organized according to the relative payload priority. Thus the present invention allows for the prioritization of payloads for each specific set of client attributes.

With continued reference to FIG. 12, evaluator 184 "=" also corresponds to value 190 "DR." Value 190 corresponds to conjunction list 200 that contains a null value 202. Value 190 also corresponds to a payload list 204 that indicates that payload "Y" illustrated at 204 should be added to the master payload list if this attribute evaluator value pair is satisfied. Accordingly, the evaluation tree 102 is merged into catalog data structures 130 and 176.

Returning to FIG. 2, at block 212 a subset of client attributes corresponding to the request for advertisement data is obtained. In an actual embodiment, and as explained above, the content request includes a variety of client attributes submitted by and/or extracted from the browser application 76. Alternatively, the advertisement delivery system 72 may request specific client attributes from the content provider 78 after the content provider 78 issues a request for the advertisement media. At block 214, the catalog data structure 130 is traversed and a master payload list is generated.

Figure 13:
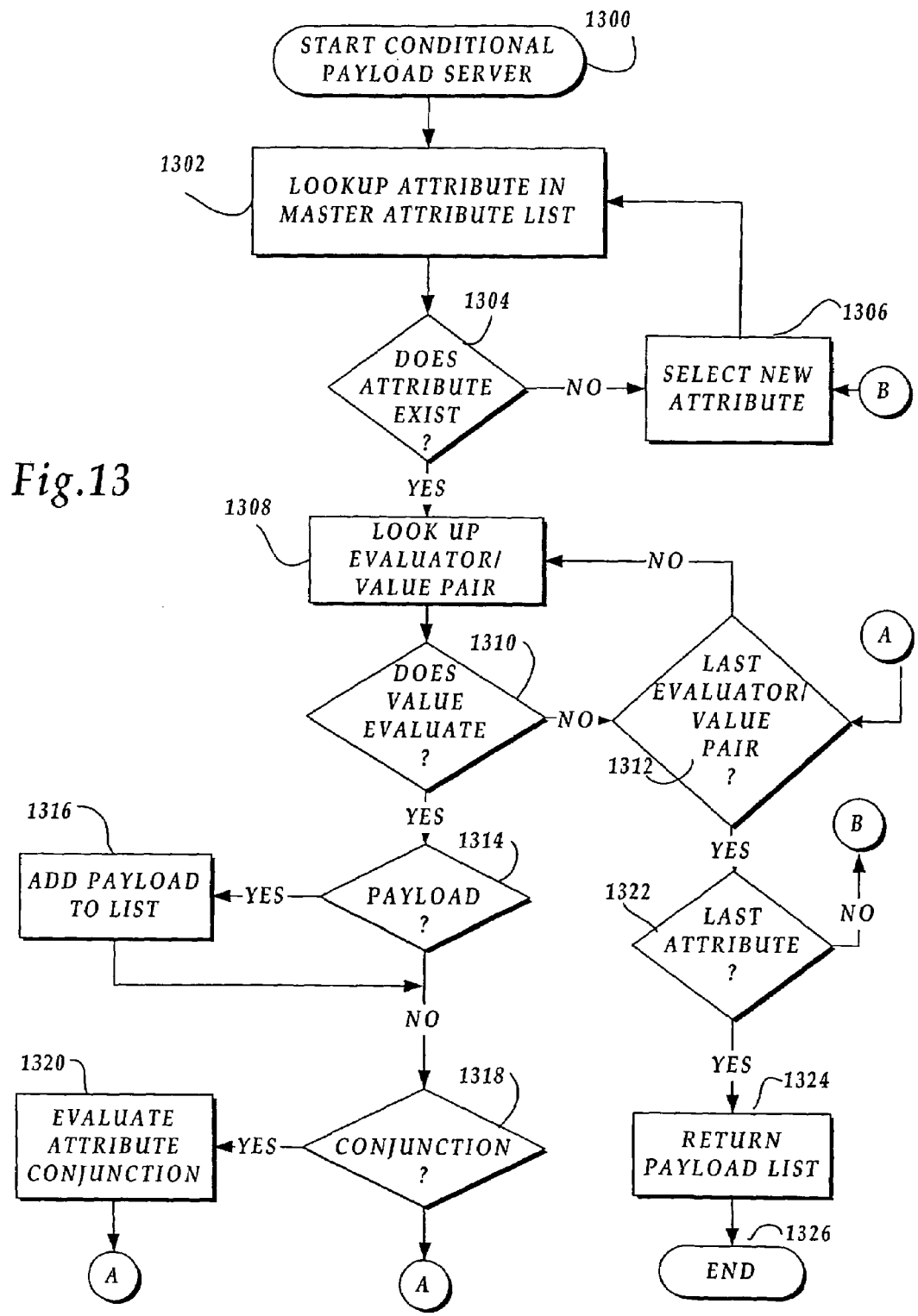
FIG. 13 is a flow diagram of a subroutine for traversing a catalog data structure and generating a payload list in accordance with the present invention.

FIG. 13 is a flow diagram illustrative of a subroutine 1300 for traversing the catalog data structure 130 with a subset of client attributes. At block 1302, a first attribute from the subset of client attributes is obtained and a test is made to determine whether the attribute exists in the master attribute list 132 at decision block 1304. If the selected attribute is not found in the master attribute list 132, a new attribute from the subset of client attributes is obtained at 1306. In such a scenario, the process repeats to block 1302 to see if the new selected attribute exists in the master attribute list. As explained above, the master attribute list 132 of the primary catalog data structure 130 may not include every client attribute that is utilized to create a payload list.

If the selected attribute is found in the master attribute list 132, at block 1308 an evaluator/value pair is obtained from the evaluator list 134 and value list 136, respectively. At decision block 1310, a test is done to determine whether the selected client attribute satisfies the evaluator/value pair. If the client attribute does not satisfy the value in evaluator/value pair, at decision block 1312 a test is done to determine whether there are other evaluator/value pairs corresponding to the selected attribute. This step allows for multiple evaluators/values in the evaluator list 134 and/or value list 136 to be evaluated. If there are additional evaluator/value pairs, the next evaluator/value pair is obtained at block 1308 and the subroutine 1300 returns to decision block 1310.

If any of the evaluator/value pairs is satisfied by the selected attribute, a test is done at decision block 1314 to determine whether there is a payload in a payload list 140. If payload exists, at block 1316 the payload or payloads listed in the payload list are added to a master payload list.

Throughout any of the iterations of decision block 1310, if no payload exists in the payload list or once the payload has been added to the list, the conjunction list 138 is examined to determine whether any conjunctions exist at decision block 1318. If no conjunctions exist, the subroutine 1300 returns to decision block 1312 to determine whether there are additional evaluator/value pairs for the selected attribute to be evaluated. However, if a conjunction exists at decision block 1318, the subroutine 1300 repeats blocks 1302 through 1318 with the new attribute identified at block 1320. As explained above, the conjunction list 140 may identify other attributes in the master attribute list 132 or may refer to one or more secondary catalog data structures 176.

After completing the evaluation of any additional attributes identified in a conjunction list 140, the subroutine 1300 returns to decision block 1312 to determine whether there are any additional evaluator/value pairs for the originally selected attribute. If there are additional evaluator/value pairs for the originally selected attribute, the next evaluator/value pair is obtained at block 1308 and the process repeats as explained above.

If there are no more evaluator/value pairs for the originally selected attribute, at decision block 1322 a test is made to determine whether there are any additional attributes in the subset of client attributes to be evaluated. If there are additional attributes, another attribute is selected at block 1306 and the subroutine 1300 repeats the process for the next attribute. By repeating the steps for more than one attribute, the present invention allows the evaluation of multiple attributes in the subset of client attributes to determine the best applicable payload.

Once the last attribute has been evaluated at decision block 1322, the master payload list is returned at block 1324 and the subroutine ends at block 1326.

Returning to FIG. 2, after the catalog has been traversed the master payload list is returned at block 216. In an actual embodiment, a payload request may specify that the advertisement delivery server 72 only deliver a single payload (advertisement media). Alternatively, a payload request may specify for a bulk return of two or more advertisement media that satisfy the subset of client attributes. At block 216, the routine ends.

By creating a catalog data structure that can contain less than all the attributes in the master attribute list, the present invention facilitates the evaluation of a subset client attributes by automatically eliminating from consideration any attribute evaluator value pairs that do not correspond to an inputted client attribute. Additionally, by allowing additional catalog data structures, the catalog data structure master attribute list does not grow as a direct function of the number of payloads processed by the system. Moreover, by prioritizing payload lists in a master payload list, the present invention determines the possible payloads and can return the payload with the highest priority with respect to each particular subset of client attributes.

In an application to an advertisement delivery system, the present invention facilitates the correlation of advertisement media payloads to a specific subset of client attributes submitted by a content provider. The use of a catalog data mitigates the need to evaluate advertisement media criteria that does not apply to the subset of client attributes and allows for the specific prioritization of the advertisement media to the content provider request.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method in a computer system for correlating a payload with a subset of attributes for selecting a payload set, the method comprising:
   generating an expression tree having multiple levels corresponding to the subset of attributes;
   mapping the expression tree into an evaluation tree;
   correlating the evaluation tree into a catalog;
   determining the payload set from the catalog;
   sending the payload set; and
   optimizing the expression tree prior to mapping the expression tree into an evaluation tree, wherein optimizing includes:
      organizing the expression tree such that each attribute expression is a leaf node and each connector is a tree node;
      scoring the expression tree, wherein each disjunctive tree node score equals the sum of its subtree, wherein each conjunctive tree node score equals the product of its subtree and wherein each leaf node score equals one; and
      for each level of the expression tree, organizing nodes such that a right-most node has the highest score.

2. The method as recited in claim 1, wherein the step of mapping the expression tree to an evaluation tree includes:
   placing a lowest scoring leaf node as the top-most node of the evaluation tree;
   placing conjunctive operations as right tree nodes;
   placing disjunctive operations as left tree nodes; and
   traversing the expression tree mapped into the evaluation tree.

3. The method as recited in claim 1, wherein the step of correlating the expression tree into the catalog includes:
   storing a first attribute in the attribute list;
   storing one or more evaluators corresponding to the first attribute in an evaluator list;
   storing one or more values corresponding to each of the one or more first attribute evaluators in a value list;
   when any conjunctions exist, storing one or more identifications of attributes corresponding to the first attribute; and
   when any payloads exist, storing one or more payloads corresponding to the first attribute.

4. A computer-readable storage bearing computer-executable instructions that, when executed in a computer system, performs a method for correlating a payload with a subset of attributes for selecting a payload set, the method comprising:
   generating an expression tree having multiple levels corresponding to the subset of attributes;
   mapping the expression tree into an evaluation tree;
   correlating the evaluation tree into a catalog;
   determining the payload set from the catalog;
   sending the payload set; and
   optimizing the expression tree prior to mapping the expression tree into an evaluation tree, wherein optimizing includes:
      organizing the expression tree such that each attribute expression is a leaf node and each connector is a tree node;
      scoring the expression tree, wherein each disjunctive tree node score equals the sum of its subtree, wherein each conjunctive tree node score equals the product of its subtree and wherein each leaf node score equals one; and
      for each level of the expression tree, organizing nodes such that a right-most node has the highest score.

5. The computer-readable storage as recited in claim 4, wherein the step of mapping the expression tree to an evaluation tree includes:
   placing a lowest scoring leaf node as the top-most node of the evaluation tree;
   placing conjunctive operations as right tree nodes;
   placing disjunctive operations as left tree nodes; and
   traversing the expression tree mapped into the evaluation tree.

6. The computer-readable storage as recited in claim 4, wherein the step of correlating the expression tree into the catalog includes:
   storing a first attribute in the attribute list;
   storing one or more evaluators corresponding to the first attribute in an evaluator list;
   storing one or more values corresponding to each of the one or more first attribute evaluators in a value list;
   when any conjunctions exist, storing one or more identifications of attributes corresponding to the first attribute; and
   when any payloads exist, storing one or more payloads corresponding to the first attribute.

* * * * *